United States Patent [19]

Bell et al.

[11] Patent Number: 4,657,746

[45] Date of Patent: Apr. 14, 1987

[54] SCRUBBING OF SULFUR DIOXIDE WITH LIME SLAGS

[75] Inventors: James A. E. Bell; Eberhard Krause, both of Oakville, Canada

[73] Assignee: Inco Limited, Toronto, Canada

[21] Appl. No.: 826,303

[22] Filed: Feb. 5, 1986

[30] Foreign Application Priority Data

Feb. 18, 1985 [CA] Canada ................................ 474513

[51] Int. Cl.$^4$ .......................... B01J 8/00; C01B 17/00
[52] U.S. Cl. ..................................... 423/242; 423/244
[58] Field of Search .......... 423/242 A, 244 A, 244 R, 423/242 R

[56] References Cited

U.S. PATENT DOCUMENTS 3,547,583 12/1970 Wilson ................................. 423/242
3,836,630 9/1974 Noguchi et al. .................... 423/242

Primary Examiner—Gregory A. Heller
Attorney, Agent, or Firm—Raymond J. Kenny; Edward A. Steen

[57] ABSTRACT

A process for removing sulfur dioxide from industrial gas streams by scrubbing the gas with an aqueous slurry including $2CaO \cdot Fe_2O_3$ (dicalcium ferrite). The $2CaO \cdot Fe_2O_3$ is present in lime slags or flotation tailings derived from non-ferrous smelting operations.

5 Claims, 2 Drawing Figures

SCRUBBING OF SULFUR DIOXIDE WITH LIME SLAGS

TECHNICAL FIELD

The instant invention relates to environmental pollution control in general and more particularly to the treatment of sulfur dioxide contained in industrial off gases.

BACKGROUND ART

Due to the growing perception that environmental pollution of any type is inimical to the well-being of all the denizens of this planet, there has been a concerted effort to reduce noxious emissions. In particular, producers of non-ferrous materials are faced with the difficult mission of reducing sulfur dioxide emissions to acceptable levels. Accordingly, over the years numerous techniques have been developed and utilized to obtain this goal.

As a result of non-ferrous smelting operations, lime slags are produced as by-products. Until recently, these lime slags were believed to be essentially useless. After recovery of valuable entrained materials (usually copper), the remainder of the slag would be discarded.

It has been determined however that these lime slags contain significant quantities of $2CaO.Fe_2O_3$ which will react with sulfur dioxide. Instead of being discarded, the slag now serves a useful purpose for sulfur dioxide control.

SUMMARY OF THE INVENTION

Noxious sulfur dioxide ($SO_2$) can be removed from industrial off gases, such as roaster or converter gases, by scrubbing with a slurry of lime slag and water. Lime slags are obtained as by-products of certain non-ferrous metal smelting operations. Some of the components of the lime slag, in particular the compound $2CaO.Fe_2O_3$, react with sulfur dioxide, water and oxygen (air) to produce harmless gypsum ($CaSO_4.2H_2O$-calcium sulfate dihydrate) for disposal. Although perhaps not technically correct, for the purposes of the specification, the expression "dicalcium ferrite" will be used to identify $2CaO.Fe_2O_3$ for want of a better term. Although the lime slags can be used 'as received', it is possible to apply upgrading operations, such as magnetic separation to concentrate the useful lime bearing constituents of the slags.

PREFERRED MODE FOR CARRYING OUT THE INVENTION

Slags from basic steel making processes, i.e., Martins process, are known to be useful for a variety of neutralizing applications including the absorption of $SO_2$.

However, the composition of these slags differ considerably from that of lime slags obtained during the smelting of non-ferrous metals, such as copper. Lime slags from non-ferrous metals smelting operations have a lower lime (CaO) and a much higher iron (Fe) content. Typical analyses (%) are given in Table I below:

TABLE I

TYPICAL SLAG ANALYSIS (in weight %)

| | CaO | SiO$_2$ | Al$_2$O$_3$ | MgO | MnO | FeO or Fe$_2$O$_3$ | Cu |
|---|---|---|---|---|---|---|---|
| Steelmaking Slag | 45 | 10 | 1 | 8 | 6 | 25 | — |
| Lime Slag (Cu Smelting) | 15–22 | 4 | 3 | 4 | 1 | 60–75 | 5–10 |

Steelmaking slags contain the major phases di- and tricalcium silicate ($Ca_2SiO_4$, $Ca_3SiO_5$), CaO, and iron and manganese oxides. In contrast, lime slags from copper smelting operations contain mainly $Fe_3O_4$ (magnetite) and dicalcium ferrite ($2CaO.Fe_2O_3$).

Dicalcium ferrite has been found to be an effective reagent for the scrubbing of $SO_2$. It was further found that the concentration of the dicalcium ferrite content of the lime slag may be increased significantly by using flotation and/or magnetic separation techniques. Thus, the tonnage of material required to neutralize a given quantity of $SO_2$ can be significantly decreased.

Typically, lime slags from non-ferrous operations contain significant levels of entrained copper metallics (5–10%). These copper values should be recovered. The copper recovery can be accomplished by recycling the entire slag to a reverberatory or electric furnace, where the copper enters the matte and the CaO related values of the lime slag report to the silicate slag and are thus lost.

Alternatively, copper can be recovered from the lime slag by grinding, screening and flotation. The resulting flotation tailings are essentially copper-free and contain mainly the compounds $Fe_3O_4$ and $2CaO.Fe_2O_3$. These flotation tailings may be discarded to the tailings area, where some of the CaO content of the slag is slowly released as $Ca(OH)_2$ (slaked lime) to provide additional neutralizing power to the $Ca(OH)_2$ reagent already present.

Figure 1:
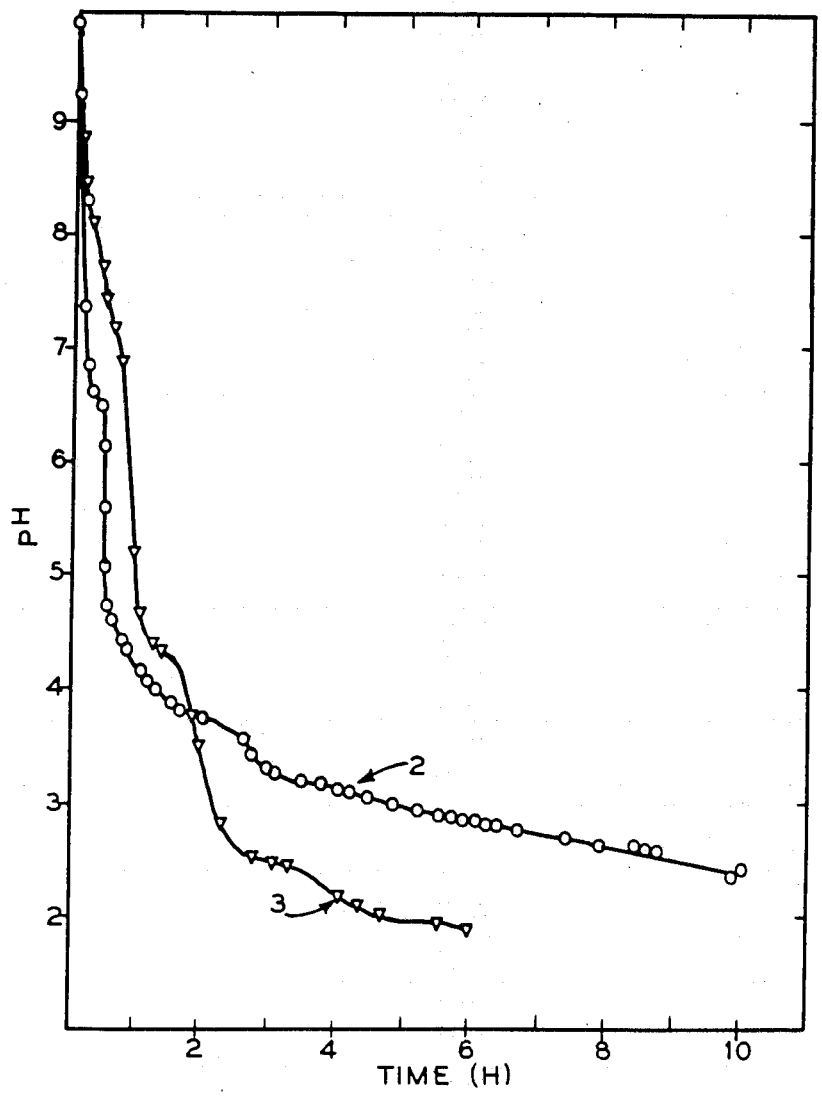
FIG. 1 is a graph depicting pH versus time during $SO_2$ scrubbing.

As alluded to earlier, the neutralizing power of lime slags can be efficiently used for the scrubbing of sulfur dioxide containing off-gases, such as roaster or converter gases. The amount of $SO_2$ that can be scrubbed depends on the feed CaO content and the final pH obtained during scrubbing. FIG. 1 shows typical pH profiles for $SO_2$ scrubbing experiments using lime slags. It can be seen that most of the $SO_2$ is scrubbed at a pH of less than 4.5, i.e., 3.0.

When 'as received' lime slags or flotation tailings are used, about 100 g $SO_2$/kg slag can be absorbed without significant dissolution of iron. The reaction may be approximated by the following stoichiometry:

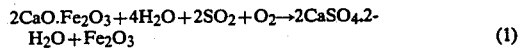

$$2CaO.Fe_2O_3 + 4H_2O + 2SO_2 + O_2 \rightarrow 2CaSO_4.2H_2O + Fe_2O_3 \tag{1}$$

Higher $SO_2$ absorptions are possible at increased iron dissolutions, according to:

$$Fe_2O_3 + 3SO_2 + 1.5O_2 \rightarrow Fe_2(SO_4)_3 \tag{2}$$

The $Fe_2(SO_4)_3$ liquor may be discarded after proper neutralization or may be used for other leaching operations requiring an acidic ferric sulfate solution. When the dicalcium ferrite content is increased by removal of the bulk of the magnetite (by magnetic separation or other means), $SO_2$ absorptions in excess of 250 g $SO_2$/kg slag are readily achieved.

Since some of the readily soluble CaO content dissolves during flotation, it is advisable to use the entire flotation tailings slurry or the entire slurry after magnetite separation for the $SO_2$ scrubbing operation. Most of the commercially available equipment for the scrubbing of $SO_2$ with slurries of basic materials (i.e., lime) can be used for this purpose. Sufficient air has to be provided to oxidize the $SO_2$ to sulfate. The minimum amount of oxygen required is about half that of the $SO_2$ content (by volume). Gypsum ($CaSO_4.2H_2O$) is formed, which can be safely discarded.

A number of trials were conducted to show the efficacy of the instant invention. The results are given below.

EXAMPLE 1

A sample of ground lime slag, analyzing (weight %) 9.1 Cu, 2.1 Ni, 46.2 Fe, 17.8 CaO, 1.25 MgO, 0.4 $Al_2O_3$, and 0.9 $SiO_2$, was obtained from a copper smelting experiment. X-ray diffraction analysis showed the sample to contain the major components $Fe_3O_4$ (magnetite) and $2CaO.Fe_2O_3$ (dicalcium ferrite). 100 grams of this slag were slurried in 400 ml of water (20% solids) and heated to 80° C. The starting pH was 9.8. Pure $SO_2$ was sparged into the slurry at a flowrate of 0.25 l/l soln.min. Breakthrough of $SO_2$ occurred after 5 minutes. The flow of $SO_2$ was continued for a total of 98 minutes. The scrubbing efficiency was 28% at the end of the experiment. The lime slag absorbed a total of 174 g of $SO_2$ per kg of slag.

The final pH was 3.3. The following dissolutions (weight %) were obtained, based on the analyses of the scrubber solids and solution: 0.1 Cu, 1 Ni, 11 Fe, 33 Ca, 1 Mg. 68% of the $SO_2$ reported to the solution (mainly as bisulfite). X-ray diffraction analysis of the residue found only $Fe_3O_4$ as a major component, suggesting that most of the $2CaO.Fe_2O_3$ had reacted during the $SO_2$ scrubbing experiment.

EXAMPLE 2

A second sample of the same ground lime slag as used in Example 1 was slurried in water (20% solids) and heated to 80° C. An $SO_2$/air mixture, containing 3.66% of $SO_2$ by volume, was sparged into the slurry at a flowrate of 0.625 l/l soln.min. The experiment was terminated after 600 minutes. The scrubbing efficiency was significantly greater than 90% at the end of the experiment. The lime slag had absorbed 125 g $SO_2$/kg slag.

The final pH was 2.35. The following dissolutions (%) were obtained: 64 Cu, 1 Ni, 1.8 Fe, 2.4 Ca, 1 Mg. Essentially all of the $SO_2$ was converted to sulfate (gypsum, $Cu^{2+}$, $Fe^{2+}$ and $Fe^{3+}$). X-ray diffraction analysis of the scrubber solids found only $Fe_3O_4$ and $CaSO_4.2H_2O$ as major constituents. Thus, Example 2 shows the importance of adding sufficient quantities of air ($O_2$) to produce environmentally acceptable sulfate (i.e., gypsum).

EXAMPLE 3

A lime slag sample from a copper smelting operation was ground, screened, and subjected to copper removal by flotation. The resulting flotation tailings analyzed (weight %) 0.7 Cu, 1.4 Ni, 47.1 Fe, 20.0 CaO, 3.9 MgO, and 4.0 $SiO_2$. The feed contained $Fe_3O_4$ and $2CaO.Fe_2O_3$ as the major phases. 100 grams of flotation tailings were slurried in 400 ml of water (20% solids), heated to 80° C., and subjected to sparging with an $SO_2$/air mixture (7.53% $SO_2$ by volume) at a flowrate of 0.625 l/l soln.min. The $SO_2$ sparging was terminated after 357 minutes. The $SO_2$ scrubbing efficiency was 99.7% at that time. The flotation tailings absorbed a total of 187 g $SO_2$/kg slag.

FIG. 1 depicts the pH profile during the $SO_2$ scrubbing process. The conditions (plotted for Examples 2 and 3) are as follows: 20% solids, 80° C., 3.66 volume percent of $SO_2$ in air (Example 2) and 7.53 volume percent of $SO_2$ in air (Example 3). The "o" denotes ground lime slag, 3.66 v/o $SO_2$ (Example 2). The "∇" denotes flotation tailings 7.53 v/o $SO_2$ (Example 3.)

Figure 2:
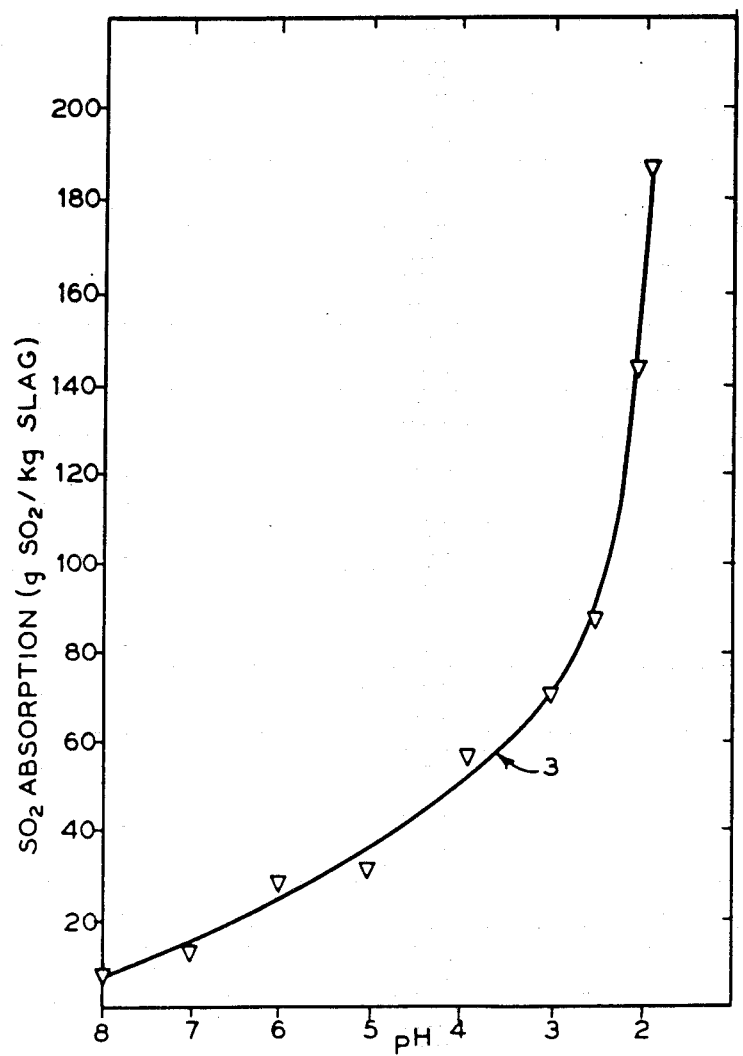
FIG. 2 is a graph depicting $SO_2$ absorption versus pH.

The final pH of Example 3 was 1.85. The absorption of $SO_2$ depended on the final pH of the scrubber slurry. FIG. 2 shows the relationship between the $SO_2$ absorption and the final pH of Example 3. The $SO_2$ absorption was 68 g/kg slag at pH 3.0, and 142 g/kg slag at pH 2.0.

X-ray diffraction analysis showed the residue to be composed mainly of $Fe_3O_4$ and $CaSO_4.2H_2O$. The following dissolutions were obtained (%): 75 Cu, 1 Ni, 4.4 Fe, 4.6 Ca, 1 Mg.

EXAMPLE 4

A second sample of the same flotation tailings used in Example 3 was subjected to a wet magnetic separation. The resulting non-magnetic fraction analyzed 28.0% Fe and 43.9% CaO. X-ray diffraction analysis found only $2CaO.Fe_2O_3$ as the major phase in the non-magnetics. The magnetic fraction contained $Fe_3O_4$ as the major phase, but still contained significant levels of CaO (15.5%).

A slurry of 75 grams of non-magnetics in 300 ml of water (20% solids) was heated to 80° C. An $SO_2$/air mixture (4.91% $SO_2$ by volume) was sparged into the slurry at a flowrate of 0.83 l/l soln.min for a total of 680 minutes. The slurry pH fell from 9.5 to 2.3. The non-magnetic portion of the lime slag had absorbed 276 g $SO_2$/kg slag. Only 55% of the available CaO content had reacted with the $SO_2$ when the pH of 2.3 was reached. Analysis showed that the solids after $SO_2$ scrubbing still contained dicalcium ferrite as a major constituent. More of this dicalcium ferrite would have reacted, if higher $SO_2$ additions had been made to reach a lower final pH value, thus resulting in higher $SO_2$ absorptions.

Example 4 demonstrates that significantly higher $SO_2$ absorptions can be achieved when the $2CaO.Fe_2O_3$ content of the lime slag is upgraded by the rejection of the bulk of the magnetite.

Although the Examples employ a slurry temperature of 80° C., the instant process may be conducted over a temperature range of about 40° C. to about 100° C.

In summary, most of the lime added to form a slag during smelting of non-ferrous metals, such as copper can be reused for the scrubbing of $SO_2$. If the lime slags are upgraded by flotation and/or magnetic separation, the amount of solids used in an $SO_2$ scrubber may be reduced significantly.

While in accordance with the provisions of the statute, there is illustrated and described herein specific embodiments of the invention, those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A scrubbing process for removing sulfur dioxide from a gas stream, the process comprising:
   (a) forming a slurry of lime slags having an initial alkaline pH including $2CaO.Fe_2O_3$ and water therin,
   (b) maintaining the slurry at a temperature range of about 40° C. to about 100° C.,
   (c) sparging an oxygen-sulfur dioxide mixture drawn from the gas stream into the slurry to lower the pH level of slurry to below 4, and
   (d) precipitating gypsum therefrom.

2. The process according to claim 1 wherein the minimum quantity of the oxygen is about half (by volume) of the sulfur dioxide level in the gas stream.

3. The process according to claim 1 wherein the lime slags are derived from non-ferrous smelting operations.

4. The process according the claim 1 wherein the concentration of $2CaO.Fe_2O_3$ in the lime slag is increased before commencing the process.

5. The process according to claim 1 wherein the pH of the slurry is below 2.

* * * * *